Patented Mar. 13, 1928.

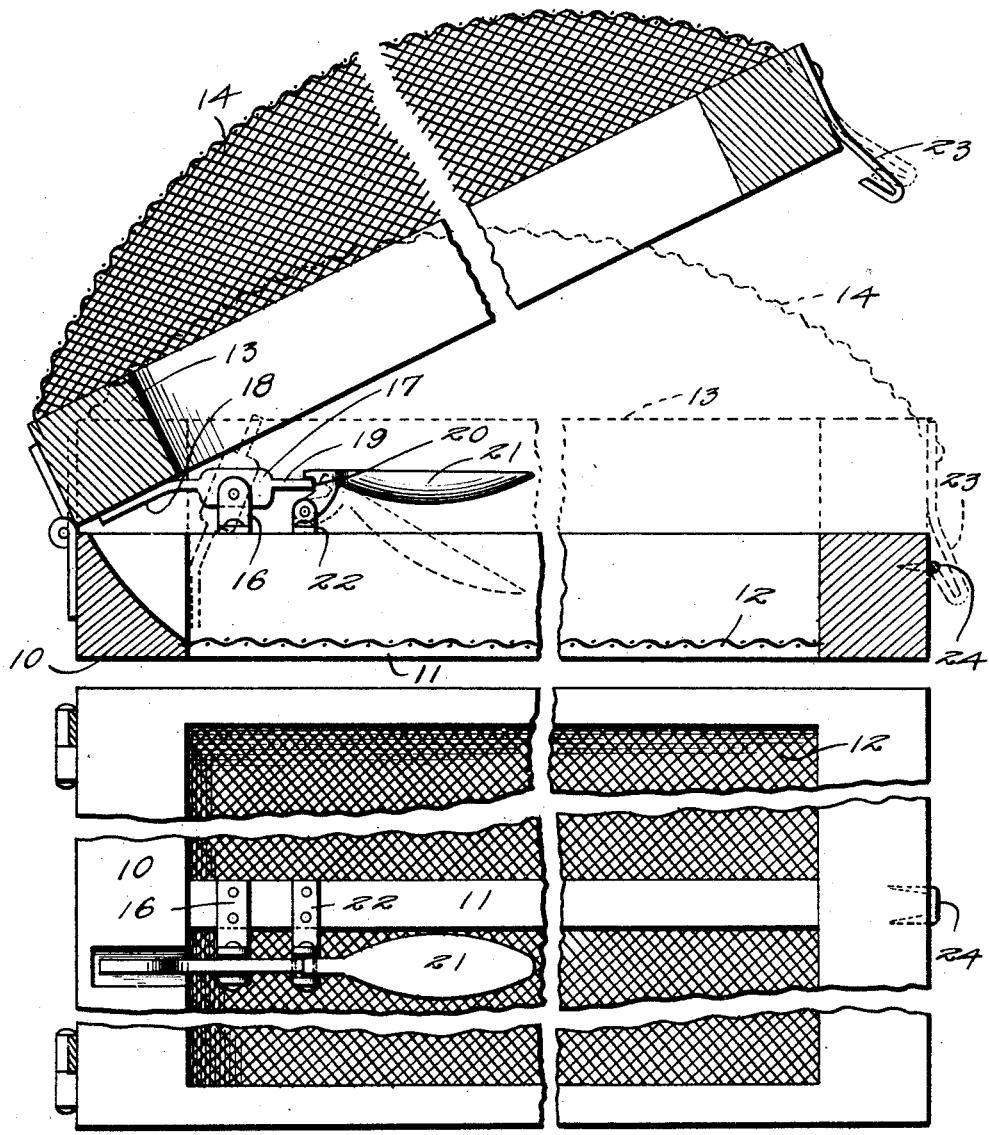

1,662,476

UNITED STATES PATENT OFFICE.

SYLVESTER S. SADOSKY, OF STAPLES, MINNESOTA.

TRAP.

Application filed December 8, 1926, Serial No. 153,352. Renewed January 13, 1928.

This invention relates to new and useful improvements in traps, and particularly to traps for catching musk rats.

One object of the invention is to provide a simple device of this character, and one which is adapted to be constructed at a low cost, but which is effective in its operation.

Another object is to provide a trap which includes a base portion and a gravity actuated cover or lid, and a trip and detent for holding the cover in elevated position until released by an animal.

Another object is to provide such a trip and detent which will quickly be released from the cover, by an animal, and which will in no way interfere with the closing or falling of the cover.

Other objects and advantages will be apparent from the following description when taken in connection with the accompanying drawing.

In the drawing:

Figure 1 is a vertical sectional view of a trap made in accordance with the present invention, the cover being raised, and the trip and detent device being shown in side elevation, the released positions of the parts being shown in dotted lines.

Figure 2 is a top plan view, the cover being removed.

Referring particularly to the accompanying drawing, 10 represents a horizontal rectangular frame, including the transverse strip 11, on which are supported the trip and detent mechanism to be later described. The said frame is covered with a suitable reticulated material, such as the wire screen 12, and hinged to one of the side members of the frame is the frame 13, forming the body of the cover or lid. This frame 13 is also covered with a reticulated material, such as the wire screen 14, but this screen is arched upwardly, as clearly seen in Figure 1, of the drawing, whereby to provide space for the trapped animal, when the cover is in lowered or sprung position. It will be noted that the transverse member of the frame 10, on which the cover is hinged, is cut away at 15, at a point adjacent the junction thereof with the member or strip 11.

Mounted on the strip 11, adjacent the hinged side of the base, is a bracket 16, and pivotally supported on said bracket is a detent member 17, one end 18, of which being curved or bent downwardly, to engage beneath the rear member of the cover frame, to hold the cover in elevated position. On the other end of the detent member 17 is a projection, or lug 19, which is arranged to engage within the notch 20, in the trip spoon or pan 21. This spoon or pan is pivotally mounted in a bracket 22, carried by the strip 11.

Secured to the frame member at the front or free edge of the cover, is a leaf spring detent or latch 23, which is adapted to engage a keeper 24, carried by the corresponding portion of the front of the base of the trap, whereby to hold the cover in closed, or sprung, position, to prevent escape of the trapped animal.

From the foregoing it will be seen that the weight of the cover, engaging on the end 18 of the detent 17, tends to lock said detent, to cause its lug end 19 to move upwardly. The fact that said lug end 19 engages in the notch of the bait pan 21, serves to prevent this movement, whereby the cover is held in elevated position, until an animal depresses the pan 21 to release the lug 19 from the notch, whereupon the cover will descend, so that its latch 23 will engage with the keeper 24, thereby entrapping the animal between the base and cover.

What is claimed is:

An animal trap including a base having a frame member and a transverse strip intersecting the latter, a member pivoted on the strip and having a bent end, a cover hinged to the frame member and arranged to be engaged by said bent end whereby to support the cover in elevated position, the other end of the pivoted member being formed with a lug, and a pivoted bait pan mounted on the said strip and provided with a notch receiving the said lug whereby to releasably hold the pivoted member in cover supporting position.

In testimony whereof, I affix my signature.

SYLVESTER S. SADOSKY.